(12) United States Patent
Lu et al.

(10) Patent No.: US 8,477,198 B2
(45) Date of Patent: Jul. 2, 2013

(54) INTERACTION CONTROL SYSTEM, METHOD FOR DETECTING MOTION OF OBJECT, HOST APPARATUS AND CONTROL METHOD THEREOF

(75) Inventors: Chih-Hung Lu, Hsinchu (TW); Hsin-Chia Chen, Hsinchu (TW); Shu-Sian Yang, Hsinchu (TW); Ren-Hau Gu, Hsinchu (TW); Ching-Lin Chung, Hsinchu (TW)

(73) Assignee: Pixart Imaging Inc., Hsinchu (TW)

( * ) Notice: Subject to any disclaimer, the term of this patent is extended or adjusted under 35 U.S.C. 154(b) by 86 days.

(21) Appl. No.: 13/176,039

(22) Filed: Jul. 5, 2011

(65) Prior Publication Data
US 2012/0044363 A1    Feb. 23, 2012

(30) Foreign Application Priority Data

Aug. 17, 2010 (TW) ............................... 99127491 A (51) Int. Cl.
  *H04N 5/225* (2006.01)
  *H04N 5/228* (2006.01)
  *H04N 5/202* (2006.01)
  *G06K 9/36* (2006.01)
(52) U.S. Cl.
  USPC ................... 348/207.99; 348/222.1; 348/254; 348/348; 348/355; 382/291

(58) Field of Classification Search
  USPC ............ 348/135–137, 207.99, 208.4, 208.14, 348/222.1, 254, 291, 348, 352; 382/291
  See application file for complete search history.

(56) References Cited

U.S. PATENT DOCUMENTS

2002/0093641 A1* 7/2002 Ortyn et al. ..................... 356/28
2008/0170142 A1* 7/2008 Kawata et al. ................ 348/294
2011/0242285 A1* 10/2011 Byren ............................. 348/47

\* cited by examiner

*Primary Examiner* — Roberto Velez
*Assistant Examiner* — Joel Fosselman
(74) *Attorney, Agent, or Firm* — WPAT, PC; Justin King (57) ABSTRACT

A method for controlling a host apparatus, includes steps of the followings. First, a pattern is projected to a detection region. Second, images of the detection region are captured and image information stream is generated based on the images. Third, an image information associated with the pattern is identified to be a background image information. Fourth, a currently captured image information is subtracted to the background image information to identify if an object appears in the detection region. Fifth, a motion of the identified object is determined based on a variation of the pattern reflected from the identified object to generate a control instruction to the host apparatus. A host apparatus, an interaction control system and a method for detecting a motion of an object are also provided.

8 Claims, 8 Drawing Sheets

INTERACTION CONTROL SYSTEM, METHOD FOR DETECTING MOTION OF OBJECT, HOST APPARATUS AND CONTROL METHOD THEREOF

FIELD OF THE INVENTION

The present invention relates to control systems, and particularly to an interaction control system.

BACKGROUND OF THE INVENTION

Figure 1:
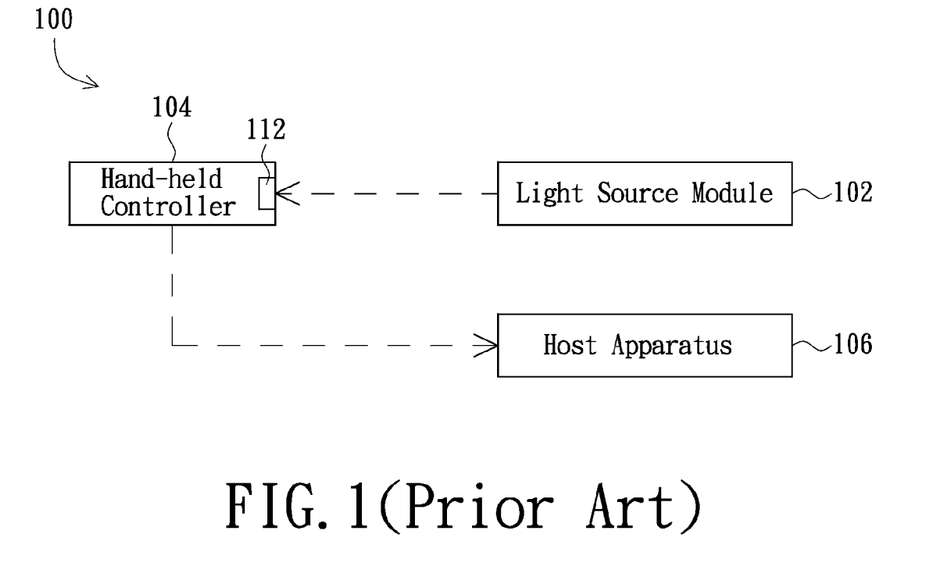
FIG. 1 is a block diagram of a conventional interaction control system.

FIG. 1 is a block diagram of a conventional interaction control system. Referring to FIG. 1, a conventional interaction control system 100 includes a light source module 102, a hand-held controller 104 and a host apparatus 106. The light source module 102 provides a plurality of point light sources for projecting light to the hand-held controller 104. Wherein, the point light sources of the light source module 102 are arranged in a line.

The hand-held controller 104 has an image sensor 112, e.g., a charge-coupled device (CCD) capable of receiving the light from the light source module 102. With this configuration, when the image sensor 112 receives the light from the light source module 102, a movement track of the hand-held controller 104 can be detected according to variation of spot size and movement direction of the point light sources on the image sensor 112. In addition, in order to obtain a movement speed of the hand-held controller 104, an accelerometer is usually configured in the hand-held controller 104.

Figure 2:
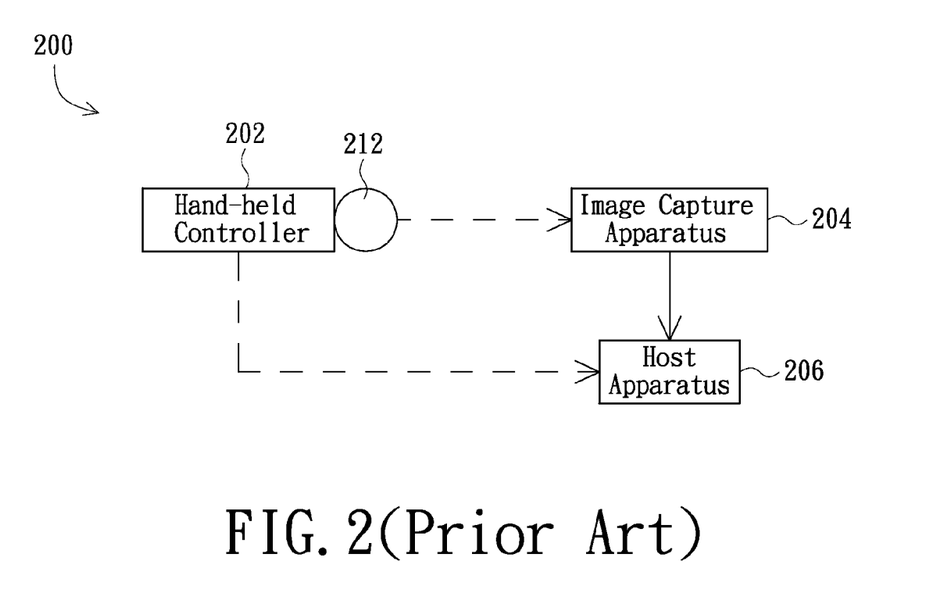
FIG. 2 is a block diagram of another conventional interaction control system.

FIG. 2 is a block diagram of another conventional interaction control system. Referring to FIG. 2, another conventional interaction control system 200 includes a hand-held controller 202, an image capturing device 204 and a host apparatus 206. In addition, a point light source 212 is configured on the hand-held controller 202. When the hand-held controller 202 moves in the space, the image sensor 204 can detect movement track of the point light source 212 and output a signal to the host apparatus 206. Therefore, the host apparatus 206 can calculate the motion of the hand-held controller 202.

In the interaction control system 200, as only one point light source 212 is configured on the hand-held controller 202, only when the hand-held controller 202 moves, the host apparatus 206 can detect the motion. However, when the hand-held controller 202 only rotates at one position, the host apparatus 206 cannot identify the motion. In this case, a gyroscope is needed to be configured on the hand-held controller 202. When the hand-held controller 202 moves, the gyroscope can output a signal to the host apparatus 206, such that the host apparatus 206 can calculate the motion of the hand-held controller 202 in the space.

As mentioned above, whatever conventional interaction control system needs special hand-held device, such that the conventional interaction system cannot work normally, when the hand-held device is damaged.

SUMMARY OF THE INVENTION

Accordingly, the present invention provides an interaction control system that implements the interaction operation without special hand-held device.

In addition, the present invention further provides a host apparatus and a method for controlling a host apparatus that allow user performing operation with interaction means.

Furthermore, the present invention provides a method for detecting a motion of an object that detects a movement track of the object in a space.

An interaction control system provided by the present invention includes a light source module, an image capturing device and an processor. The light source module projects a pattern to a detection region, and the image capturing device captures images of the detection region for generating an image information stream to the processor. Thus, the processor subtracts a currently captured image information to the background image information so as to obtain a subtracted image information for determining whether or not an object appearing in the detection region. When the processor determines the object appearing in the detection region, calculating a motion of the object based on a variation of the pattern imaged on one of surfaces of the object toward the light source, and generating a control instruction to a host apparatus.

From another viewpoint, a host apparatus provided by the present invention includes a control module, a light source module, an image capturing device and a processor. The light source module projects a pattern to a detection region, and the image capturing device captures images of the detection region for generating a image information stream to the processor. Thus, the processor subtracts a currently captured image information to the background image information so as to obtain a subtracted image information for determining whether or not an object appearing in the detection region. When the processor determines the object appearing in the detection region, calculating a motion of the object based on a variation of the pattern imaged on one of surfaces of the object toward the light source, and generating a control instruction to the control module so as to control the host apparatus.

In one embodiment of the present invention, the light source comprises a laser diode, and diffractive optical element or a micro electro mechanical system (MEMS) optical device. Wherein, the diffractive optical element or MEMS device is configured on a path of a laser beam emitted by the laser diode. Therefore, the diffractive optical element or the MEMS devices convert the laser beam into a planer light source of the said pattern.

From another viewpoint, a method for controlling a host apparatus provided by the present invention includes projecting a pattern to a detection region and generating an image information stream for forming a background image information of the detection region. Then, the background image information is subtracted to the currently captured image for obtaining a subtracted image information, so as to determine whether or not an object appearing in the detection region. When the object is detected in the detection region, calculating a motion of the object according a variation of the pattern imaged on one of surfaces of the object, and generating corresponding control instruction to the host apparatus so as to control the host apparatus.

In one embodiment of the present invention, the pattern has a plurality of parallel lines extending toward a predetermined direction.

From another viewpoint, a method for detecting a motion of an object provided by the invention includes projecting a pattern to a detection region and generating a image formed by reflecting the pattern from the detection region and generating an image information stream, wherein the image information stream has a plurality of pixels. Second, the currently captured image information is subtracted into a background image information for obtaining a subtracted image information. Then, absolute values of gray-scale pixels in the subtracted image information are detected. When at least one of the absolute values of the gray-scale pixels is greater than a predetermined value, determining an object appearing in the detection region where the absolute value is greater than the predetermined value. In addition, determining a movement track of the object according to a movement of the pixels having the absolute values greater than the predetermined value.

Since the present invention projects a pattern to a detection region, and determines a movement track of an object according to variation of the pattern imaged on one of surfaces of an object in the detection region, the present invention implements interaction control technology without special handheld device.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 3:
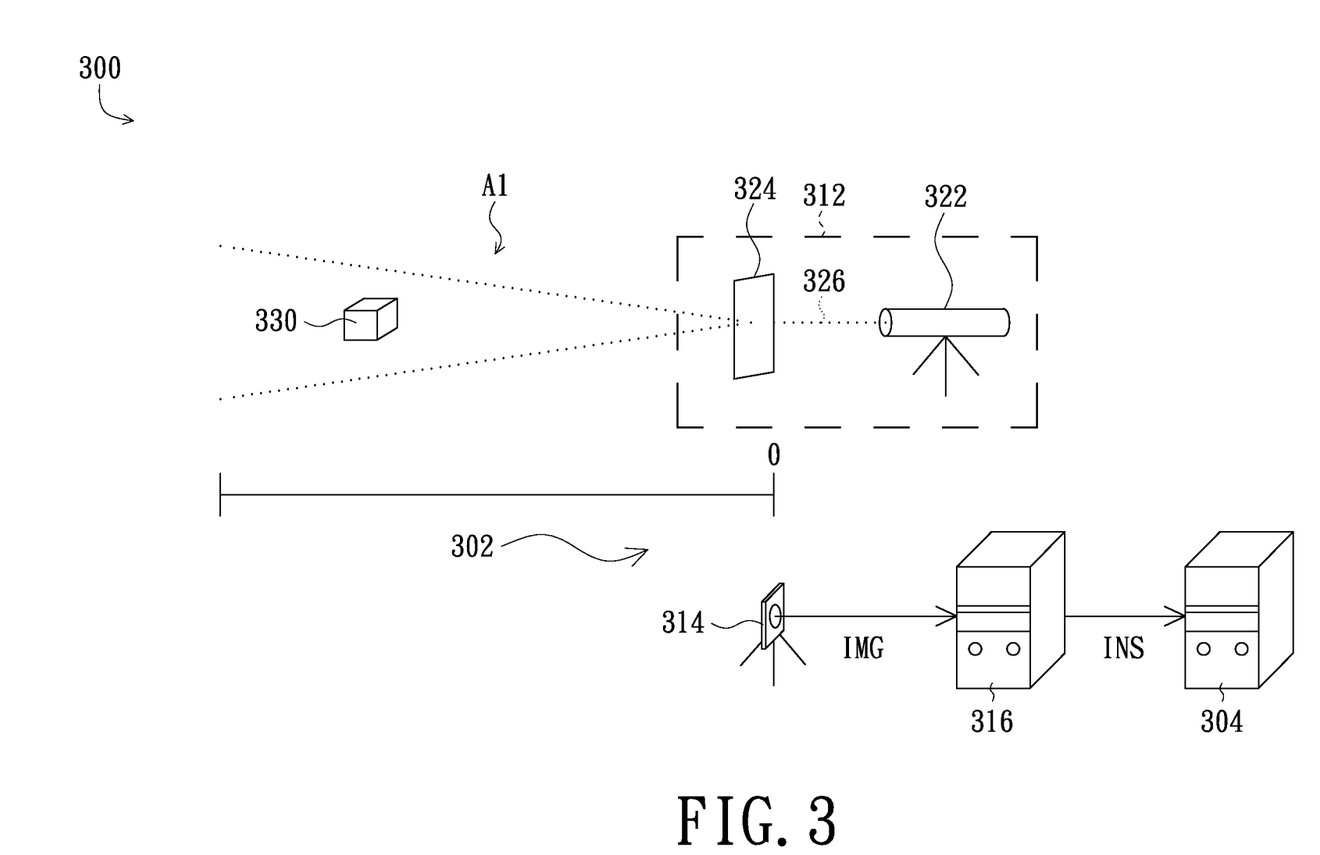
FIG. 3 is a schematic view of an interaction control system in accordance with a preferred embodiment of the present invention.
Figure 4:
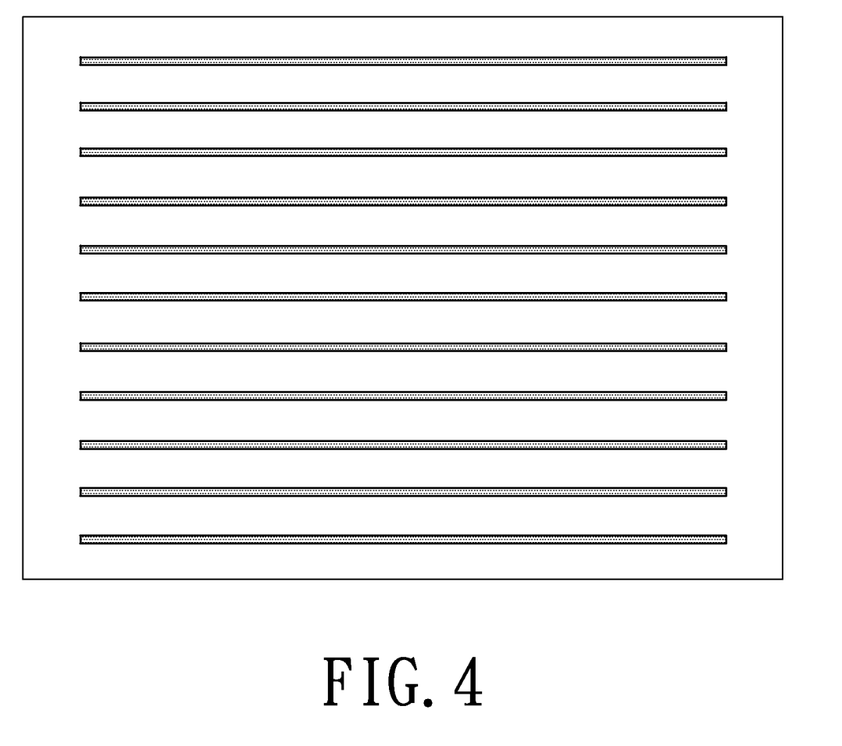
FIG. 4 shows a pattern projected by a light source module of the interaction control system of FIG. 3.

FIG. 3 is a schematic view of a host apparatus in accordance with a preferred embodiment of the present invention. Referring to FIG. 3, in the present embodiment, a host apparatus 300, e.g., a computer system or a game machine includes an interaction control system 302 and a control module 304. The interaction control system 302 includes a light source module 312, an image capturing device 314 and a processor 316. Wherein, the light source 312 is capable of projecting a pattern to a detection region A1. Referring to FIG. 4, in the present embodiment, the pattern has a plurality of parallel lines extending toward a predetermined direction.

Referring again to FIG. 3, in the present embodiment, the light source module 312 includes a laser diode 322 and a diffractive optical element 324. In other embodiments, the diffractive optical element 324 can be replaced by a MEMS optical device. When a laser beam 326 reach the diffractive optical element 324, the laser beam 326 is diffracted in the thereby so as to generate the pattern, as shown in FIG. 4. Then, the pattern is projected to the detection region A1 by the light source module 312.

In addition, the image capturing device 314 may be a CCD, a complementary metal-oxide-semiconductor (CMOS) device or a video camera. The image capturing device 314 is capable of capturing images of the detection region A1, and outputting an image information stream to the processor 316. In the embodiment, the processor 316 may be a single chip, an embedded system, a central processing unit, a computer system or an application software. When the processor 316 receives the image formation IMG streaming, and determines the image formation IMG remaining unchanged in a predetermined time, the processor 316 would identify the image formation IMG to be a background image information. Meanwhile, the processor 316 will save the background image information.

After getting the background image information, the processor 316 can determine whether or not an object 330 appearing in the detection region A1 by subtracting a currently captured image information IMG to the background image information. When the processor 316 determines the object 330 appearing in the detection region A1, the processor 316 can calculate a motion of the object 330 according to a variation of the pattern imaged from one of surfaces of the object 330 toward the light source module 312, and generate corresponding control instruction INS to the control module 304.

In detail, the image information IMG has a plurality of pixels, if the image information IMG is the same as the background image information, i.e., no object appears in the detection region A1, such that absolute value of the gray scale of each pixel in a subtracted image information will be less than a predetermined value. In contrast, if at least one absolute value of the gray scale of a pixel in a subtracted image information is greater than the predetermined value, example, as the pixel region 502 shown in FIG. 5, it can be determined that the object 330 appears in the pixel region 502.

Figure 5:
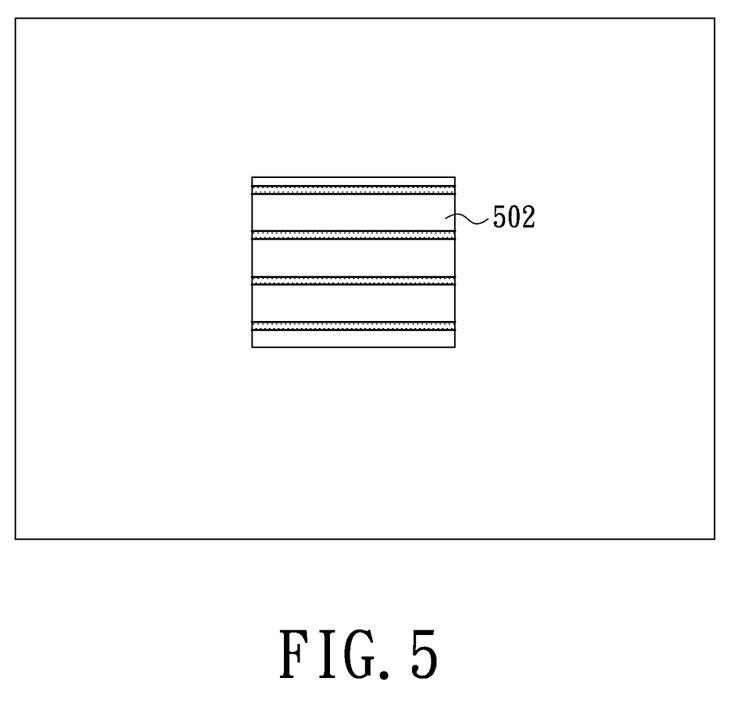
FIG. 5 shows a pixel region in a subtracted image information associated with the pattern of FIG. 4, wherein the absolute values of the gray-scale pixel region are greater than a predetermined value.
Figure 6A:
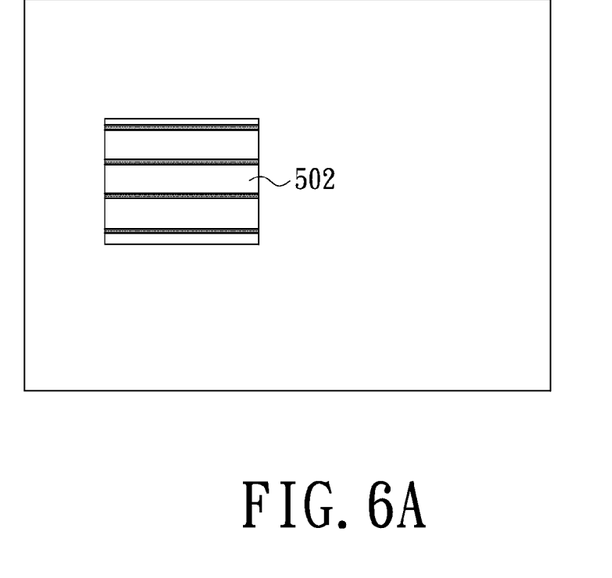
FIG. 6A shows the pixel region of FIG. 5 moves from right to left.
Figure 6B:
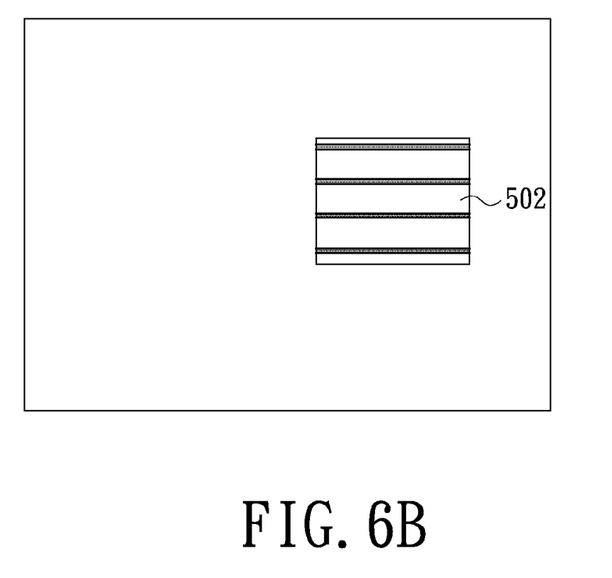
FIG. 6B shows the pixel region of FIG. 5 moves from left to right.

The processor 316 can determine a motion of the object 330 according to movements of the pixel region 502 in the subtracted image information wherein the absolute vales of the gray scale of the pixels are greater than the predetermined value. For example, in FIG. 6A, the pixel region 502 moves from right to left, and in FIG. 6B, the pixel region 502 moves from left to right. The processor 316 can output corresponding control instruction INS to the control module 304.

Figure 7:
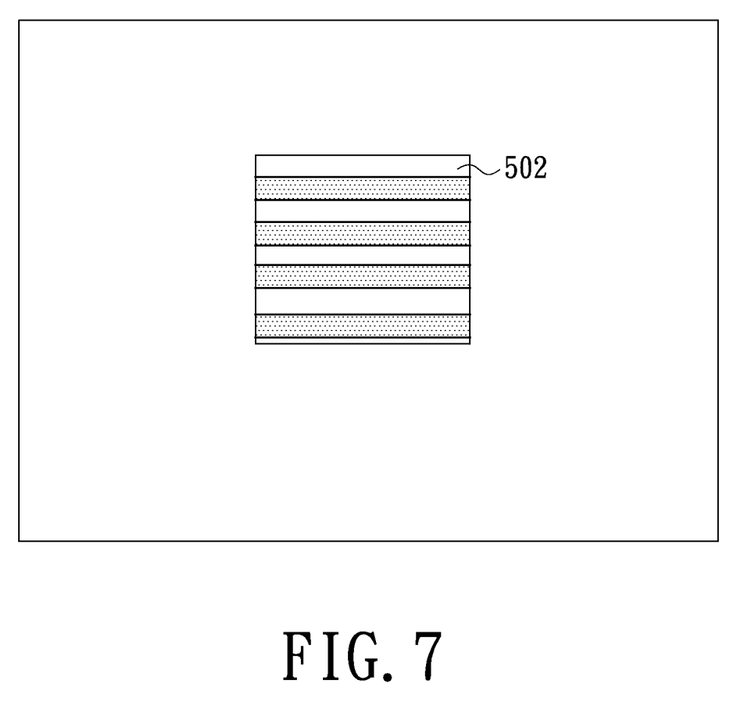
FIG. 7 shows line width of the pixel region of FIG. 5 is increased.

In addition, referring to FIG. 7, if it is found that the line width of the pixel region 502 becomes thicker, it can be determined that the object 330 is closer to a reference point O as shown in FIG. 3. Meanwhile, the processor 316 can output corresponding control instruction INS to the control module 304. In contrast, when the object 330 is away from the reference point O, the line width of the pixel region 502 becomes thinner.

Figure 8:
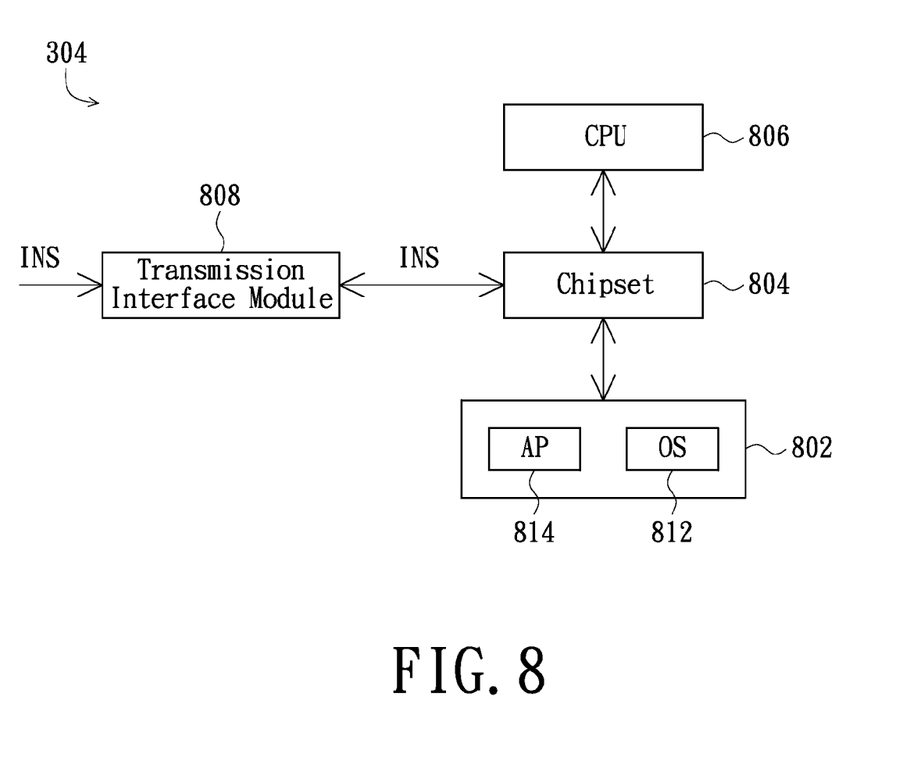
FIG. 8 is a block diagram of a control module in accordance with a preferred embodiment of the present invention.

When the control module 304 receives the control instruction INS, the control module 304 controls operations of the host apparatus 300 according to the control instruction INS. FIG. 8 shows a block diagram of a control module in accordance with a preferred embodiment of the present invention. For one person in the art, it is known that the FIG. 8 only shows a structure of the control module, and is not a limitation of the spirit of present invention.

Referring to FIG. 8, the control module 304 includes a storing unit 802, a chip module 804 and a central processing unit 806. The storing unit 802 may be a non-volatile memory, e.g., a flash memory. In other embodiments, the storing unit 802 may be a hard disk drive. In the storing unit 802, an operation system (OS) 812 and an application program (AP) 814 can be installed herein.

In addition, the chip module 804 can be coupled to a transmission interface module 808, and the transmission interface module 808 can be linked to the processor 316 to receive the control instruction INS. In other embodiments, the transmission interface module 808 may be linked to the processor 316 by a bus interface or a universal interface. In further other embodiments, the transmission interface module 808 may be linked to the processor 316 by a network, such as an Internet or a local area network (LAN).

When the processor 316 outputs the control instruction INS to the control module 304, the processor 316 transmits the control instruction INS to the transmission interface module 808. At this time, the chip module 804 can get the control instruction INS via the transmission interface module 808 and give the control instruction INS to the operation system 812 and the application program 814. Then, the central processing unit 806 can go along corresponding calculations and actions according to operation of the operation system 812 based on the control instruction INS, thus controlling the host apparatus 300 to work.

Figure 9:
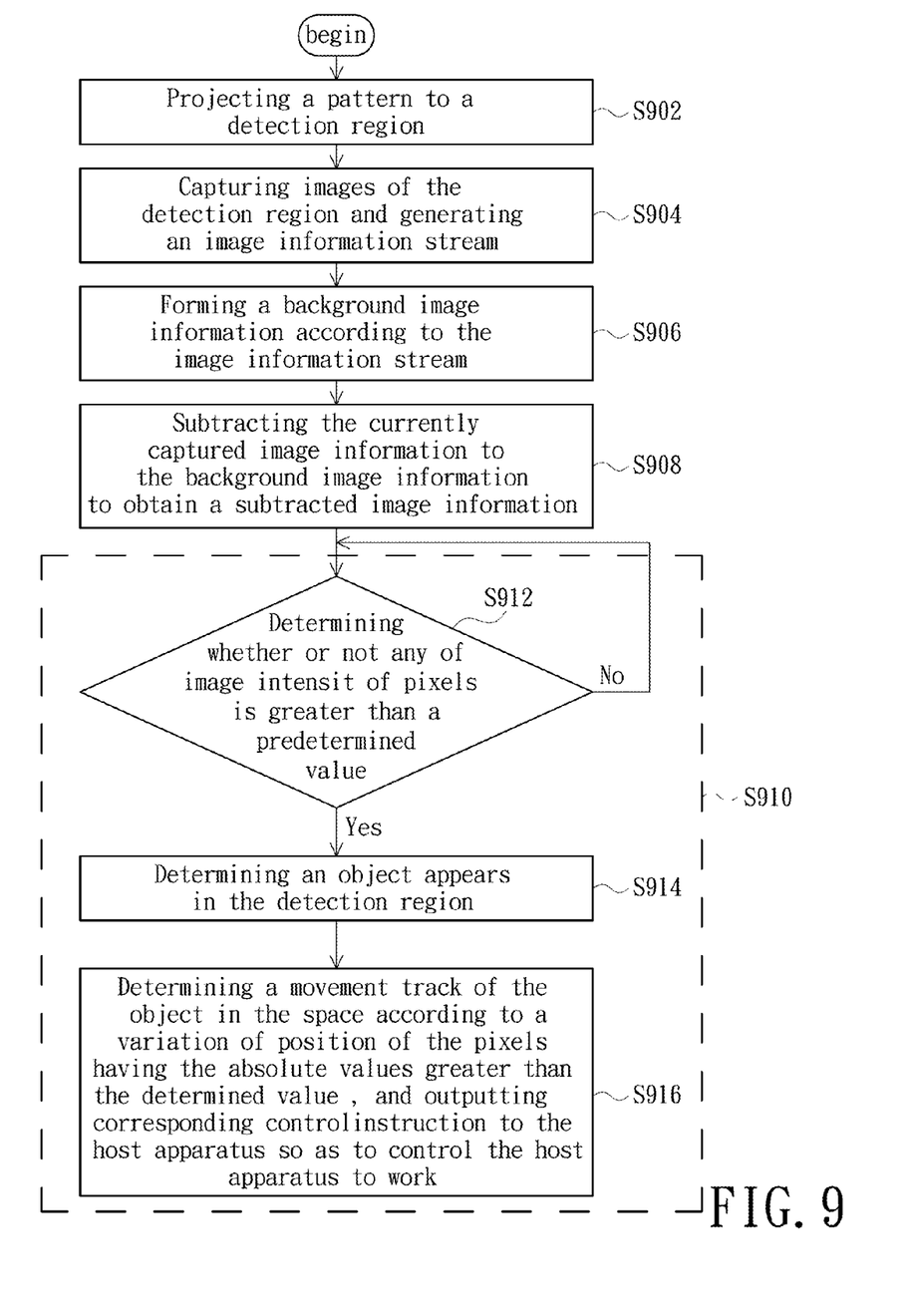
FIG. 9 is flow chart of a method for controlling a host apparatus in accordance with a preferred embodiment of the present invention.

FIG. 9 is a flow chart of a method for controlling a host apparatus in accordance with a preferred embodiment of the present invention. Referring to FIG. 9, first, as shown in step S902, a pattern is projected to a detection region. Secondly, as shown in step S904, the images of the detection region are captured for generating an image information stream. Then, go to step S906, a background image information of the detection region is formed. Next, go to step S908, a subtracted image information is obtained by subtracting a currently captured image information to the background image information for determining whether or not an object appearing in the detection region. When the object appears in the detection region, go to step S910, a motion of the object is calculated based on a variation of the pattern imaged on one of surfaces of the object.

In more detail for step S910, it includes the step S912 that is used to determine whether or not any of image intensity of pixels, such as absolute values of the gray scale of the pixels, is greater than a predetermined value in the subtracted image information. When at least one of absolute values of a gray scale of the pixels is greater than the predetermined value in the subtracted image information, i.e., it is "Yes" in the decision of the step S912, then go to step S914, it can be determined that the object appears in the detection region. At this time, go to step S916, a movement track of the object in the space can be determined by detecting motions of the pixel region having the absolute values of the gray scale greater than the determined value in the subtracted image information, and a corresponding control instruction is generated to the host apparatus so as to control the host apparatus to work.

Concluded from the above description, in the present invention, a motion of an object in a detection region is determined based on a variation of the pattern projected by a light source module and reflected by a surface of the object. According to the present invention, a hardware cost is reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An interaction control system, comprising:
   a light source module, projecting a pattern to a detection region, wherein the pattern has a plurality of parallel lines extending toward a predetermining direction;
   an image capturing device, capturing images of the detection region and generating an image information stream based on the images; and
   a processor, coupled to the image capturing device for obtaining a subtracted image information by subtracting the currently captured image information to a background image information of the detection region so as to determine whether or not an object appearing in the detection region, when the object appears in the detection region, calculating a motion of the object based on a variation of the pattern imaged on a surface of the object toward the light source module, and generating corresponding control instruction to a host apparatus,
   wherein the processor detects variation of line width of the surface of the object according to amount of pixels having the absolute value of the gray scale greater than a predetermined value, and the processor determines that the object is closer to a reference point when the line width of each line imaged on the surface is thicker and determines that the object has a farther distance from the reference point when the line width of each line imaged on the surface is thinner.

2. The interaction control system claimed as claim 1, wherein the light source module comprises:
   a laser diode, emitting a laser beam; and
   a diffractive optical element or a MEMS optical device, configured on a light path of the laser beam to convert the laser beam into a planer light source of the pattern.

3. The interaction control system claimed as claim 1, wherein the image capturing device is video camera, CCD device or CMOS device.

4. A host apparatus, comprising:
   a control module;
   a light source module, projecting a pattern to a detection region, wherein the pattern has a plurality of parallel lines extending toward a predetermining direction;
   an image capturing device, capturing images of the detection region and generating an image information stream based on the images;
   a processor, coupled to the image capturing device for obtaining a subtracted image information by subtracting the currently captured image information to a background image information of the detection region so as to determine whether or not an object appearing in the detection region, when the object appears in the detection region, calculating a motion of the object based on a variation of the pattern imaged on a surface of the object toward the light source module, and generating corresponding control instruction to the control module, so as to control the host apparatus,
   wherein the processor detects variation of line width of the surface of the object according to amount of pixels having the absolute value of the gray scale greater than a predetermined value, and the processor determines that the object is closer to a reference point when the line width of each line imaged on the surface is thicker and determines that the object has a farther distance from the reference point when the line width of each line imaged on the surface is thinner.

5. The host apparatus claimed as claim 4, wherein the light source module comprises:
   a laser diode, emitting a laser beam; and
   a diffractive optical element or a MEMS optical device, configured on a light path of the laser beam to convert the laser beam into a planer light source of the pattern.

6. A method for controlling a host apparatus, comprising:
   projecting a pattern to a detection region, wherein the pattern has a plurality of parallel lines extending toward a predetermining direction;
   capturing images of the detection region for generating an image information stream to form a background image information of the detection region;
   subtracting the currently captured image information to the background image information for obtaining a subtracted image information, so as to determine whether or not an object appearing in the detection region;
   calculating a motion of the object when the object appears in the detection region based on a variation of the pattern imaged on a surface of the object, comprising:
      detecting variation of line width of one of surfaces of the object according to amount of pixels having the absolute value of the gray scale greater than the predetermined value;
      determining that the object is closer to a reference point when the line width of each line imaged on the surface is thicker; and
      determining that the object has a farther distance from the reference point when the line width of each line imaged on the surface is thinner; and
   generating corresponding control instruction to the host apparatus so as to control the host apparatus.

7. The method claimed as claim 6 wherein the pattern is formed by a plurality of parallel lines extending toward a predetermined direction.

8. A method for detecting a motion of an object, comprising:
   projecting a pattern to a detection region, wherein the pattern has a plurality of parallel lines extending toward a predetermining direction;
   capturing images of the pattern reflected from the detection region and generating an image information stream, wherein the image information stream has a plurality of pixels;
   subtracting the currently captured image information to a background image information for obtaining a subtracted image information;
   detecting a gray scale of each pixel of the subtracted image information to determine whether or not absolute values of gray-scale of each pixel are greater than a predetermined value;
   determining an object appears in the detection region, when detecting at least one of the absolute values of the gray scale of the pixels be greater than the predetermined value;
   determining a movement track of the object according to a movement of the pixel having the absolute value of the gray scale greater than the predetermined value;
   detecting variation of line width of one of surfaces of the object according to amount of pixels having the absolute value of the gray scale greater than the predetermined value;
   determining that the object is closer to a reference point when the line width of each line imaged on the surface is thicker; and
   determining that the object has a farther distance from the reference point when the line width of each line imaged on the surface is thinner.

* * * * *